(12) United States Patent
Kwak et al.

(10) Patent No.: US 9,262,066 B2
(45) Date of Patent: Feb. 16, 2016

(54) USER TERMINAL DEVICE AND METHOD FOR DISPLAYING BACKGROUND SCREEN THEREOF

(75) Inventors: Ji-yeon Kwak, Seoul (KR); Hyun-jin Kim, Seoul (KR); Joon-kyu Seo, Gyeonggi-do (KR); Sang-keun Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 394 days.

(21) Appl. No.: 13/617,371

(22) Filed: Sep. 14, 2012

(65) Prior Publication Data

US 2013/0159902 A1    Jun. 20, 2013

(30) Foreign Application Priority Data

Dec. 8, 2011 (KR) .................. 10-2011-0131109

(51) Int. Cl.
| | | |
|---|---|---|
| G06F 3/0488 | (2013.01) | |
| G06F 3/0481 | (2013.01) | |
| G06F 3/0482 | (2013.01) | |
| H04M 1/725 | (2006.01) | |

(52) U.S. Cl.
CPC ............ *G06F 3/0488* (2013.01); *G06F 3/0481* (2013.01); *G06F 3/0482* (2013.01); *H04M 1/72544* (2013.01)

(58) Field of Classification Search
CPC .... G06F 9/4443; G06F 3/0481; G06F 3/0482
USPC ....................................................... 715/765
See application file for complete search history.

(56) References Cited

U.S. PATENT DOCUMENTS

| | | | |
|---|---|---|---|
| 6,274,403 B1 | 8/2001 | Klages et al. | |
| 7,864,195 B2 * | 1/2011 | Rimas et al. | 345/619 |
| 8,195,641 B2 * | 6/2012 | Rucker et al. | 707/713 |
| 8,606,326 B2 * | 12/2013 | Oh et al. | 455/566 |
| 8,786,559 B2 * | 7/2014 | Hogan | 345/173 |
| 2005/0079894 A1 | 4/2005 | Shin et al. | |
| 2005/0149856 A1 | 7/2005 | Rimas et al. | |
| 2006/0112354 A1 | 5/2006 | Park et al. | |
| 2008/0195972 A1 | 8/2008 | Lacey et al. | |
| 2009/0093275 A1 | 4/2009 | Oh et al. | |
| 2009/0193351 A1 | 7/2009 | Lee et al. | |

(Continued)

FOREIGN PATENT DOCUMENTS

| | | |
|---|---|---|
| EP | 2 136 290 | 12/2009 |
| EP | 2 618 547 | 7/2013 |

OTHER PUBLICATIONS

GroovyPost.com: "How to Resize and UnPin Windows 8 Metro App Tiles", XP054976053, Sep. 19, 2011, 1 page.

(Continued)

*Primary Examiner* — David Phantana Angkool
(74) *Attorney, Agent, or Firm* — The Farrell Law Firm, P.C.

(57) ABSTRACT

A user terminal device and a method are provided. The user terminal includes a display unit for displaying a plurality of UI lines, each including displayed objects of different categories, and a background image corresponding to one of the objects displayed on the plurality of UI lines; and a control unit for controlling the display unit to change the objects displayed on the plurality of UI lines in accordance with an update state of the objects, reconfigure the changed objects, and display the reconfigured objects; wherein a length of each of the plurality of UI lines is changeable individually.

20 Claims, 19 Drawing Sheets

(56) References Cited

U.S. PATENT DOCUMENTS

| | | | |
|---|---|---|---|
| 2010/0103124 A1* | 4/2010 | Kruzeniski et al. | 345/173 |
| 2010/0299592 A1 | 11/2010 | Zalewski et al. | |
| 2011/0072361 A1 | 3/2011 | Sakai et al. | |
| 2011/0074697 A1 | 3/2011 | Rapp et al. | |
| 2011/0119627 A1 | 5/2011 | Cho et al. | |
| 2011/0163968 A1* | 7/2011 | Hogan | 345/173 |
| 2011/0231796 A1* | 9/2011 | Vigil | 715/810 |
| 2011/0254846 A1 | 10/2011 | Lee et al. | |
| 2011/0300910 A1* | 12/2011 | Choi | 455/566 |
| 2013/0139109 A1* | 5/2013 | Kim et al. | 715/835 |
| 2013/0311920 A1* | 11/2013 | Koo et al. | 715/765 |
| 2014/0118312 A1* | 5/2014 | Oyama | G06F 3/038 345/179 |
| 2014/0253520 A1* | 9/2014 | Cueto | G06F 3/0383 345/179 |
| 2015/0227308 A1* | 8/2015 | Kim | G06F 3/04847 715/769 |

OTHER PUBLICATIONS

Anonymous: "[Windows 8 Start Screen] How to Pin, Unpin, Resize, Move and Search Tiles—Tweaking with Vishal", Internet, XP055212391, Dec. 5, 2011, 4 pages.

European Search Report dated Sep. 18, 2015 issued in counterpart application No. 12855584.4-1972, 11 pages.

* cited by examiner

USER TERMINAL DEVICE AND METHOD FOR DISPLAYING BACKGROUND SCREEN THEREOF

PRIORITY

This application claims priority under 35 U.S.C. §119(a) to Korean Patent Application No. 10-2011-0131109, which was filed on Dec. 8, 2011, in the Korean Intellectual Property Office, the entire content of which is incorporated herein by reference.

BACKGROUND OF THE INVENTION

1. Field of the Invention

The present invention relates generally to a user terminal device and method for displaying a background screen therein and, more particularly, to a user terminal device and method for displaying a background screen having a background image and UI lines.

2. Description of the Related Art

Due to the development of electronic technologies, a variety of user terminal devices, such as mobile phones, Motion Picture Experts Group (MPEG) Audio Layer-3 (MP3) players, Personal Digital Assistant (PDAs), tablet Personal Computers (PCs) and other portable electronic devices have been developed and are commonly used.

Most user terminal devices include a display unit. A user can select various functions on the screen of the user terminal device. In particular, a user can download applications via application stores and install the downloaded applications to their own devices. Icons of the installed applications or icons of functions included in the user terminal device are displayed on the device's background screen. Herein, a background screen refers to a basic screen that is displayed after the user terminal device is turned on and completes loading. Conventional user terminal devices provide a background screen where icons of applications and folders are arranged without a specific order. Accordingly, if there are a great number of icons, a user must scroll through a plurality of screens in order to find an application that the user wishes to use.

As explained above, conventional background screens merely act as a gateway for searching and executing applications, and are not convenient enough to satisfy a user's needs. Accordingly, there is a need for a user terminal device that provides a more user-friendly and convenient background screen and a method for displaying such a background screen.

SUMMARY OF THE INVENTION

Accordingly, the present invention has been made to solve the above-mentioned and other related disadvantages occurring in the prior art. The present invention relates to a user terminal device that displays a background screen, which is configured such that a user can easily select and check functions and contents provided by the user terminal device and a method for displaying a background therein.

According to an embodiment of the present invention, a user terminal device is provided. The user terminal device includes a display unit for displaying a plurality of UI lines, each including displayed objects of different categories, and a background image corresponding to one of the objects displayed on the plurality of UI lines; and a control unit for controlling the display unit to change the objects displayed on the plurality of UI lines in accordance with an update state of the objects, reconfigure the changed objects, and display the reconfigured objects, wherein a length of each of the plurality of UI lines is changeable individually.

Herein, the plurality of UI lines is displayed along one side of the background image, each of the plurality of UI lines is divided into a plurality of object regions in which objects of a corresponding category are displayed, and a most recently updated object from among the objects displayed on each corresponding UI line is moved to and displayed in an object region at an end of each corresponding UI line.

In addition, the control unit controls at least one of a displayed length of the plurality of UI lines and a displayed size of the object regions according to an amount of updates in each of the objects.

In addition, upon detecting a user input corresponding to a touch and drag with respect to one of the plurality of UI lines, the control unit increases or reduces a length or width of the touched UI line along a direction in which the touched UI line is dragged.

In addition, upon detecting a user input corresponding to a touch upon one of the plurality of UI lines, the control unit controls the display unit to display, at an end of the touched UI line, an indication of whether the touched UI line can be dragged.

If no user input is detected for more than a predetermined period of time, the control unit enters a lock mode and controls the display unit to display an idle screen including a content list in which a plurality of content version information items is arranged in update order, wherein, upon detecting a user input corresponding to a drag on the content list, the display unit displays a preview image corresponding to each of the plurality of content version information items along one side of the idle screen according to the drag, and wherein, upon receiving a user selection of one of the plurality of content version information items from the content list, the control unit cancels the lock mode and controls the display unit to display an execution screen corresponding to the selected content version information item.

In addition, the background screen includes a fixed menu region displaying at least one fixed menu, and, upon receiving a selection of a fixed menu item from the fixed menu region, the control unit executes a function corresponding to the selected fixed menu item and, upon detecting a predetermined user input with respect to the fixed menu region, the control unit converts the background screen into a full menu screen.

Meanwhile, the control unit controls the display unit to sequentially output images corresponding to the objects displayed on each of the plurality of UI lines as the background image.

In addition, upon detecting a user input corresponding to a touch with respect to an object from one of the plurality of UI lines, the control unit ends the display of the plurality of UI lines and controls the display unit to display, near the selected object, at least one other object related to the selected object.

In the above-described embodiments of the present invention, the objects include at least one of a photo, a video, an image, a text, an icon, and a widget screen.

According to another embodiment of the present invention, a method for displaying a background screen of a user terminal device is provided. The method includes displaying a background screen having a plurality of UI lines, each including displayed objects of different categories, and a background image corresponding to one of the objects displayed on the plurality of UI lines; and changing the objects displayed on the plurality of UI lines in accordance with an update state of the objects, reconfiguring the changed objects, and displaying the reconfigured objects, wherein a length of each of the plurality of UI lines is individually changeable.

In addition, the plurality of UI lines is displayed along one side of the background image, each of the plurality of UI lines is divided into a plurality of object regions in which category objects corresponding to the UI lines are displayed, and a most recently updated object from among objects displayed on each corresponding UI line is moved to the object region at an end of each corresponding UI line.

Meanwhile, at least one of a displayed length of each of the plurality of UI lines or a displayed size each of the object regions is adjusted differently according to an amount of updates in each of the categories and displayed.

The method may further include, performing, upon detecting a user input corresponding to a touch and drag with respect to one of the plurality of UI lines, an increase or reduction of a length or a width of the touched UI line along a direction in which the touched UI line is dragged.

The method may further include, displaying, upon detecting a user input corresponding to a touch upon one of the plurality of the UI lines, at an end of the touched UI line, an indication of whether the touched UI line can be dragged.

The method may further include, entering, if no user input is detected for more than a predetermined period of time, a lock mode and displaying an idle screen including a content list in which a plurality of content version information items is arranged, displaying, upon receiving a user input corresponding to a drag with respect to the content list, a preview image corresponding to each of the plurality content version information items along one side of the idle screen according to the drag and cancelling, upon receiving a user selection of one of the plurality of content version information items from among the content list, the lock mode and displaying an execution screen corresponding to the selected content version information item.

The method may further include, executing, upon receiving a selection of a fixed menu item included in a fixed menu region in the background screen, a function corresponding to the selected fixed menu item and switching, upon detecting a predetermined user input corresponding to the fixed menu region, the background screen over a full-menu screen.

The method may further include, removing, upon detecting a user input corresponding to touch upon an object of one of the plurality of UI lines, the plurality of UI lines and displaying, near the selected object, at least one other object related to the selected object.

Meanwhile, the objects include as at least one of a picture, a video clip, an image, a text, an icon and a widget screen.

A non-transitory recording media storing a program to employ a method for displaying a background screen is provided. The method includes displaying a background screen having a plurality of UI lines, each including displayed objects of different categories and a background image corresponding to one of the objects displayed on the plurality of UI lines; and changing the objects displayed on the plurality of UI lines in accordance with an update state of the objects, reconfiguring the changed objects, and displaying the reconfigured objects, wherein each of the plurality of UI lines is divided into a plurality of object regions in which category objects corresponding to each of the UI lines are displayed, and a length of each of the plurality of UI lines is individually changeable.

BRIEF DESCRIPTION OF THE DRAWINGS

The above and other features, aspects and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention are described with reference to the accompanying drawings.

Figure 1:
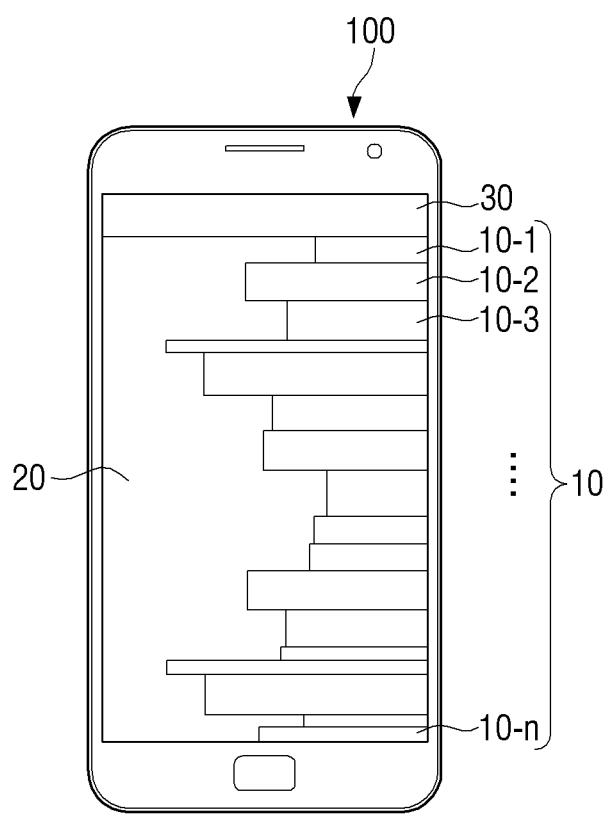
FIG. 1 is a diagram illustrating a configuration of a background screen displayed in a displaying apparatus according to an embodiment of the present invention.

FIG. 1 is a diagram illustrating a background screen of a user terminal device according to an embodiment of the present invention.

Referring to FIG. 1, the user terminal device 100 displays a background screen. Herein, the background screen refers to a basic screen that is displayed after the user terminal device 100 is turned on and completes loading.

Referring to FIG. 1, a plurality of User Interface (UI) lines 10, a background image 20 and a fixed menu 30 are displayed on a background screen.

The UI line 10 is a line where a variety of objects are displayed. Each object may be any of a picture, a video clip, an image, a text, an icon, a widget screen, and/or other information or contents, which can be displayed on the user terminal device 100. Objects of different categories may be displayed on each of UI lines 10-1 through 10-n. The category of each object may be determined with various standards such as a program type, a content type and usage frequency. Such categories may include, for example, a communication category, a Social Networking Service (SNS) category, a multimedia category, a broadcasting category, an application icon category, etc.

Each of the categories may correspond to an application folder. Various objects belonging to a same category may be allocated to one UI line or a plurality of UI lines and displayed. If a UI line corresponds to a multimedia category, objects such as a thumbnail image, a preview video clip, a playback screen of MP3, etc., may be displayed sequentially.

The length of each of the UI lines may be changed individually. In other words, a user may enlarge or contract the each length of the UI lines by a touch-and-drag manipulation. For example, FIG. 1 illustrates a case the adjusted length of each the UI lines is different from each other.

Meanwhile, according to another embodiment of the present invention, the each length of the UI lines may be the same, and a user may enlarge or contract the each length of the UI lines jointly. For example, the join enlargement or contraction may be performed by manipulating an additional key installed to the user terminal device 100.

Objects displayed on each of the UI lines 10 are reloaded in real time in accordance with various updates to states and other changes. For example, if a pre-installed application program or a pre-installed widget program has an updated content, the user terminal device 100 reconfigures a UI line by changing an object according to the updated content. The updated content may be provided from various storage media connected to an external server or the user terminal device 100. The changed object may shift to an end of the UI line, or to the background image 20, and displayed. According to an embodiment of the present invention, an update object may be identified by changing a color of a region where the changed object is displayed, letting the region go on and off or highlighting the region.

Meanwhile, an image corresponding to one of the objects displayed on the UI lines 10 is provided as the background image 20. For instance, an original photo image corresponding to a thumbnail image displayed on one UI line may be displayed as the background image 20. The background image 20 may change sequentially as time passes. In other words, if there is a plurality of UI lines 10 and various objects are displayed on each of the UI lines, images corresponding to the first object of the first UI line 10-1 up through the last object of the last UI line 190-n may be displayed as the background image in sequence.

According to another embodiment of the present invention, an image corresponding to an object selected by a user on the UI line may be displayed as the background image.

According to another embodiment of the present invention, only images of objects displayed on at least a single main UI line, which is set as a default among a plurality of UI lines, may be displayed sequentially as the background image.

According to another embodiment of the present invention, an image corresponding to a newly updated object among objects displayed on a plurality of UI lines may be displayed as the background image.

As described above, the background image may display updated contents corresponding to various applications or widget programs installed to the user terminal device 100, and may be altered in response to a change to a UI line.

Referring back to FIG. 1, the fixed menu region 30 is displayed on one side of the background screen 20. In this present example, the fixed menu region 30 is displayed at an upper side of the background screen 20. In the fixed menu region 30, icons of most-frequently used major functions, such as a camera menu, a phone menu, a text-message menu and an Internet-connection menu, are displayed with a fixed position. The fixed menu displayed in the fixed menu region 30 may be set as a default when manufacturing the user terminal device 100, and/or a user may register specific functions in the fixed menu region 30 when using the user terminal device 100.

Figure 2:
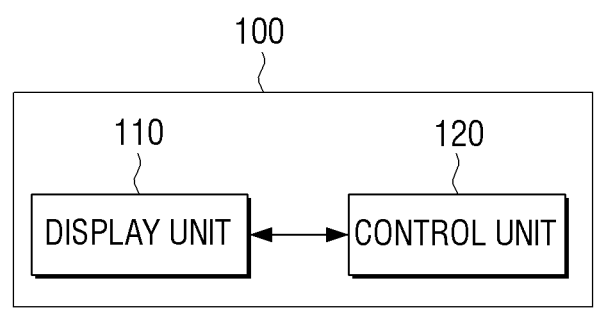
FIG. 2 is a diagram illustrating a configuration of the displaying apparatus according to an embodiment of the present invention.

FIG. 2 is a block diagram illustrating a configuration of a user terminal device 100 according to an embodiment of the present invention.

Referring to FIG. 2, the user terminal device 100 includes a display unit 110 and a control unit 120.

The display unit 110 displays a background screen having a plurality of UI lines presenting objects of different categories and a background image corresponding to one of the objects displayed on the plurality of UI lines.

The control unit 120 performs various operations by executing programs installed to the user terminal device 100. If a program or a content used by a program is updated, the control unit 120 reconfigures a background screen in accordance with the updated state.

Specifically, the control unit 120 reloads objects displayed on a plurality of UI lines and displays the reloaded objects. The control unit 120 may also control the display unit 110 to change the each length of the plurality of UI lines individually according to user input and display the adjusted plurality of UI lines.

The plurality of UI lines may be displayed on one side of the background image. For example, FIG. 1 illustrates a case where UI lines are displayed on the right side of the background image, but the UI lines may be displayed in other places, such as on the left side, in the upper part, in the lower part and at the center of the background image.

The control unit 120 controls the display unit 110 to reconfigure the background image in various ways according to various events including an updated state, a user manipulation and a user's selection.

Figure 3:
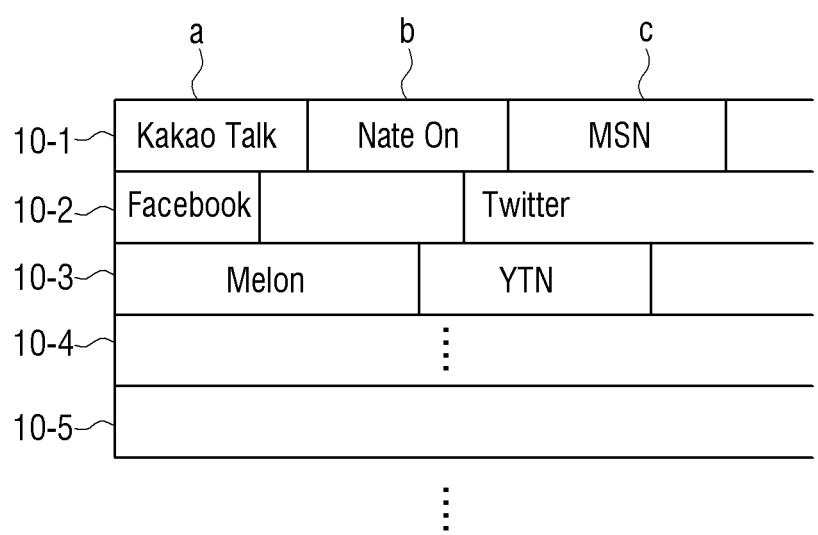
FIG. 3 is a diagram illustrating a configuration of UI lines according to an embodiment of the present invention.

FIG. 3 is a diagram illustrating a configuration of UI lines according to an embodiment of the present invention.

Referring to FIG. 3, only five UI lines 10-1 to 10-5 from among a plurality of displayed UI lines are depicted for convenience. Each of the UI lines 10-1 to 10-5 is divided into a plurality of object regions in which category objects corresponding to the UI lines appear. In the first UI line 10-1, various kinds of regions, such as a region 'a' including an icon, an image, a text and/or a text message corresponding to a "Kakao Talk" program, a region 'b' including objects corresponding to a "Nate On" program and a region 'c' including objects corresponding to an "MSN" program, may appear. The regions 'a', 'b', and 'c' may be set to have the same or different sizes depending on various standards, such as an amount of updates and usage frequency. The size of the regions may also be increased or reduced by a user manipulation.

As described above, the first line 10-1 includes objects corresponding to various communication programs. Meanwhile, the second line 10-2 includes objects corresponding to SNS programs, and the third, fourth and fifth lines 10-3 to 10-5 include objects, of various different categories including multimedia, broadcasting and application icons.

A user may change the length of the UIs 10-1 to 10-5 individually or jointly.

Each of the objects displayed on the UI lines may also be arranged sequentially. For example, objects along an end of the right side of the display in sequence according to how recently each respective object was downloaded or processed.

If an object of a UI line is touched, the control unit 120 may control the display unit 110 to display a full High-Definition (HD) image of the touched object as a background image. Herein, the control unit 120 may operate differently according to a touching operation. In other words, if the touch is a short touch, the control unit 120 may control the display unit 110 to replace only the background image with an image corresponding to the touched image while keeping the UI line intact as illustrated above. However, if the touch is a long touch, the control unit 120 may control the display unit 110 to switch the whole background over to an execution screen corresponding to the selected object.

Figure 4:
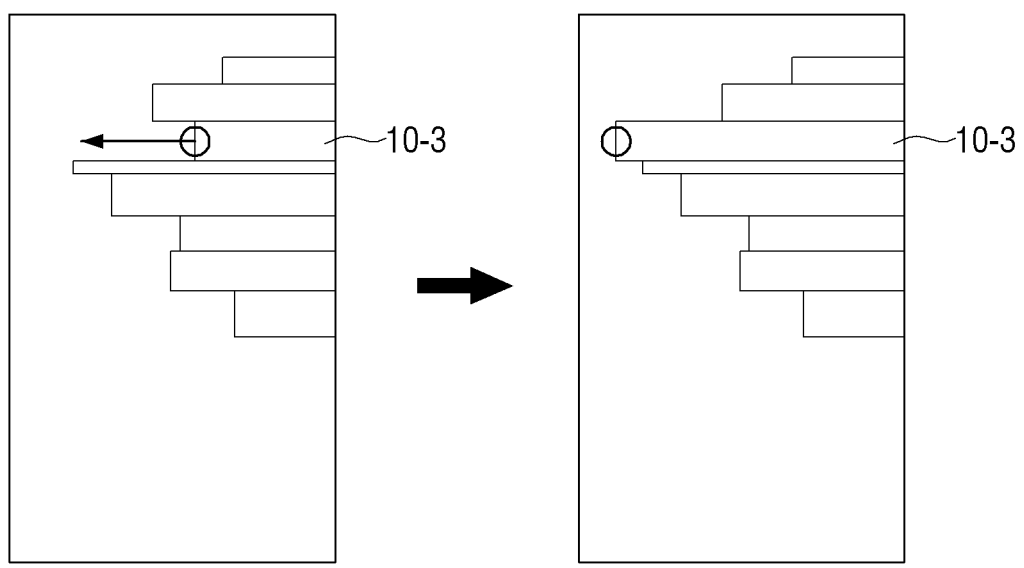
FIG. 4 is a diagram illustrating a method for adjusting length of UI lines according to an embodiment of the present invention.

FIG. 4 is a diagram illustrating an example of a method for changing lengths of UI lines according to an embodiment of the present invention.

Referring to FIG. 4, a user may enlarge or contract the length of the UI line by touching the UI lines and dragging it with a user's hand.

Referring to FIG. 4, a user touches a third UI line 10-3 as shown in the leftmost image, drags the line to the left side and enlarges the third UI line 10-3 as shown in the rightmost image.

Figure 5:
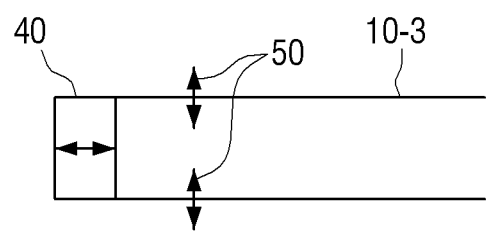
FIG. 5 is a diagram illustrating an example of an indicator displayed when a UI line is touched according to an embodiment of the present invention.

FIG. 5 is a diagram illustrating an example of an indicator that becomes activated when a user changes a UI line according to an embodiment of the present invention. Referring to FIG. 5, if the user touches a UI line 10-3, an indicator 40 may appear to indicate whether the touched UI line 10-3 can be dragged at the end of the UI line 10-3, in the upper part or in the lower part of the UI line 10-3. The indicator 40 may be displayed along with arrows 50 as shown in FIG. 5, but may alternatively be displayed as a text message or other images in accordance with embodiments of the present invention. Through this process, the user may adjust the length and/or width of the UI line 10-3.

Figure 6:
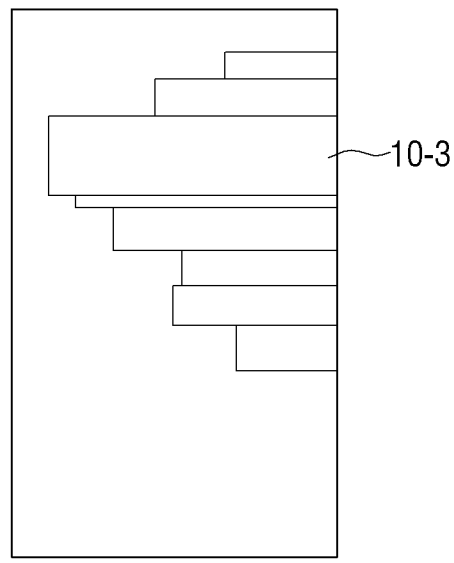
FIG. 6 is a diagram illustrating a width-increased UI line according to an embodiment of the present invention.

FIG. 6 is a diagram illustrating an example of a width-increased UI line according to an embodiment of the present invention. Referring FIG. 6, a user may enlarge width of a UI line 10-3 by dragging the UI line 10-3 towards the upper or lower part of the display after touching the UI line 10-3 with two fingers or by dragging the UI line to the upper part or to the lower part after touching the UI line with a single finger. When these kinds of user manipulations are detected, the control unit 120 controls the display unit 110 to adjust the length or the width of the UI line according to the user manipulation and display the UI line. As described above, each of the objects displayed on the UI line 10-3 may be reloaded and changed in real time in accordance with an update state. In this case, the control unit 120 may utilize any of a variety of indications to provide notice of a newly reloaded.

Figure 7:
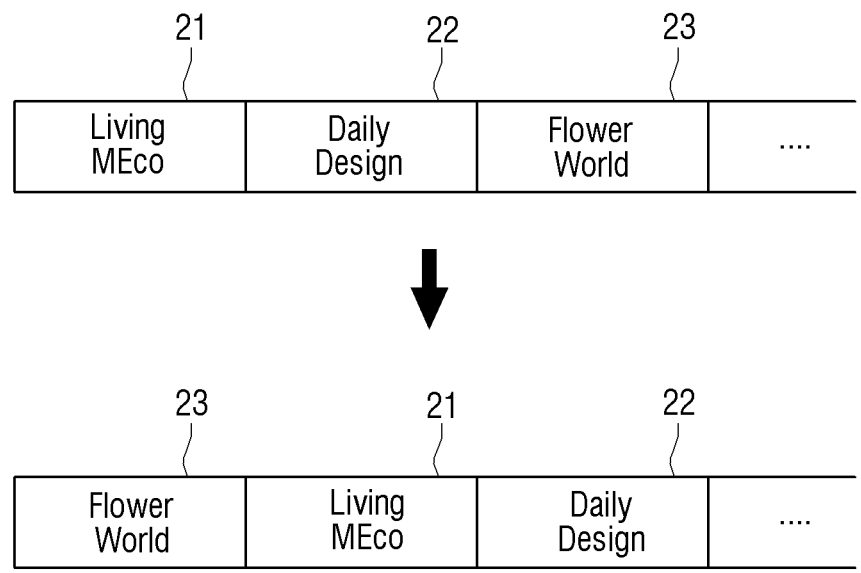
FIG. 7 is a diagram illustrating display of an updated object that is moved to an end of a UI line according to an embodiment of the present invention.

FIG. 7 is a diagram illustrating an example of a reloaded object moved to a specific part of a UI line and displayed according to an embodiment of the present invention. Referring to FIG. 7, a UI line including a plurality of object regions 21, 22 and 23. If an object displayed on the third object region 23 as shown in the upper image is reloaded, the reloaded object is moved to the first object region 21 and displayed as shown in the lower image. Objects already displayed on the first and second object regions 21 and 22 are moved one step towards the right. Due to this re-arrangement, a user may recognize that an object located on one side of the background image 20 is the most recently reloaded object.

The length of the UI lines and/or the length of objects may differ depending on an amount of updates to the UI lines or objects, respectively.

Figure 8:
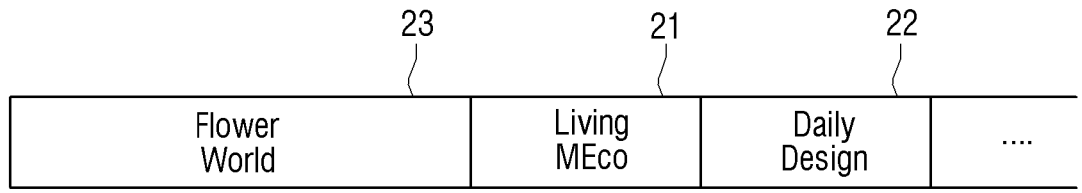
FIG. 8 is a diagram illustrating a size-increased information region according to an amount of updates in information according to an embodiment of the present invention.

FIG. 8 is a diagram illustrating a size-increased information region according to an amount of updates in information according to an embodiment of the present invention.

Referring to FIG. 8, if an amount of updates of an object that is moved to a first object region 21 increases from the amount of updates to that same object as shown in FIG. 7, the length of the first object region 21 increases. Accordingly, the size of the object region may be automatically set according to an amount of updates and/or information to be displayed.

If all of the UI lines cannot be simultaneously displayed on a background screen, the UI lines may be scrolled up or down by a user manipulation in order to view UI lines that are not currently displayed.

Figure 9:
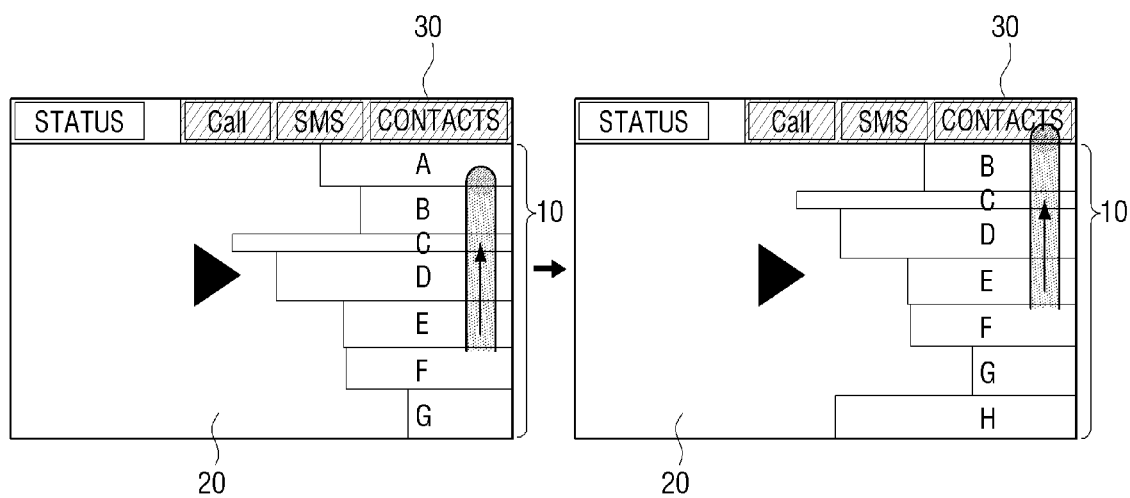
FIG. 9 is a diagram illustrating a method for scrolling a plurality of UI lines according to a user manipulation according to an embodiment of the present invention.

FIG. 9 is a diagram illustrating a method for scrolling a plurality of UI lines according to a user manipulation according to an embodiment of the present invention.

Referring to FIG. 9, if a user touches a specific point on the UI lines 10 as shown in the leftmost image and drags the touch point upwards, the UI lines 10 are moved to upwards as shown in the rightmost image, and a new UI line H is added below the currently displayed UI lines 10. In this case, a fixed menu region 20 is not scrolled. The control unit 120 may determine whether the users' touch is intended to scroll the UI lines 10 upwards or downwards, or to enlarge or contract the width of a UI line according to a location of the touched point, a length of time of the user's touch, and/or a pace of the user's touch.

For instance, if the touched point is located on a boundary between UI lines, the control unit 120 may enlarge or contract the width of a UI line. However, if the touched point is located inside of the UI line, the control unit 120 may perform a scrolling manipulation. In another example, if a touch time exceeds a critical time, the control unit 120 may enlarge or contract the width of the UI line according to a moving direction. However, if the touch time does not exceed a critical time, the control unit 120 may perform a scrolling manipulation according to the moving direction. In another example, if the moving pace is faster than a critical pace when the user is still touching a specific location, the control unit 120 may perform a scrolling manipulation. However, if the moving pace is less than a critical pace, the control unit 120 may enlarge or contract the width of the UI line. The control unit 120 may calculate coordinates of the touched point and a dragged direction using a touch sensor placed inside of the display unit 110, determine a user's intention based on the calculation results, and change a configuration or a location of the UI lines in various ways as described above.

Figure 10:
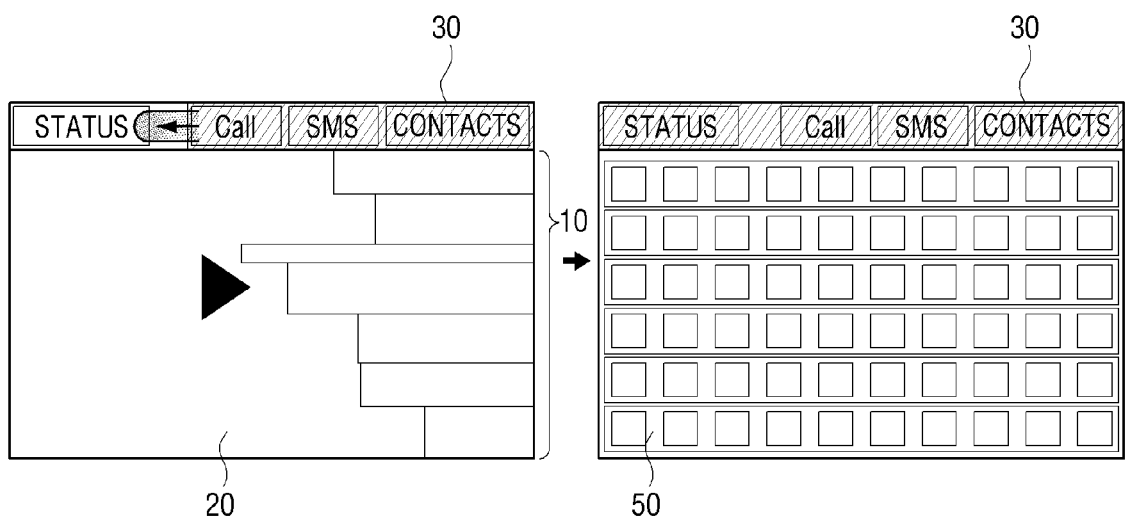
FIG. 10 is a diagram illustrating a method for switching a background screen over a full-menu screen according to a user manipulation according to an embodiment of the present invention.

FIG. 10 is a diagram illustrating a method for switching a background screen over a full-menu screen according to a user manipulation according to an embodiment of the present invention.

Referring to FIG. 10, if a user touches a fixed menu region 30 as shown in the leftmost image and drags the region towards the left, UI lines 10 displayed on the right side of a background image 20 are jointly moved to the left, covering up the background image 20. Accordingly, objects included in the UI lines 10 may be displayed across a screen as shown in the rightmost image. Herein, such a screen is referred to as a full-menu screen 50. On the full menu screen 50, each of the UI lines has a different category on the full-menu screen 50, just like the UI lines so that objects corresponding to each of the categories may be displayed on the corresponding each of the UI lines. Herein, a location and a configuration of a fixed menu displayed on the fixed menu region 30 are fixed.

The configuration of the full-menu screen 50 is not limited to the above-described example. In accordance with an embodiment of the present invention, if a user manipulation to switch the background screen 20 over to the full-menu screen 50 is input, the full-menu screen 50 may be configured to remove the UI lines 10 and arrange icons corresponding to applications or widget programs installed to the user terminal device 100.

Figure 11:
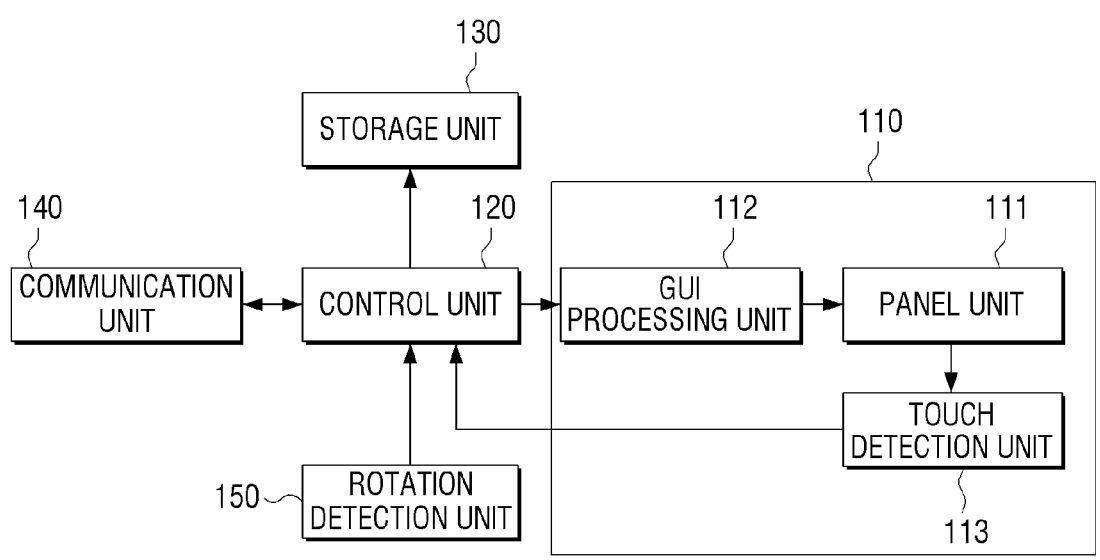
FIG. 11 is a block diagram illustrating an example of a configuration of a user terminal device according to an embodiment of the present invention.

FIG. 11 is a block diagram illustrating an example of a configuration of a user terminal device according to an embodiment of the present invention.

Referring to FIG. 11, the user terminal device includes a display unit 110, a control unit 120, a storage unit 130, a communication unit 140, and a rotation detection unit 150.

The display unit 110 includes a panel unit 111, a Graphical User Interface (GUI) processing unit 112 and a touch detection unit 113. The panel unit 110 includes a Liquid Crystal Display (LCD) panel, a backlight unit, etc. (not shown). The panel unit 110 displays a screen through cells of the LCD panel according to data provided from the GUI processing unit 112 while the backlight unit is turned on.

The GUI processing unit 112 configures a background screen according to a control of the control unit 120. More specifically, if the control unit 120 executes a firmware stored in the storage unit 130, the GUI processing unit 112 configures a background image and UI lines according to the firmware's operation. The GUI processing unit 112 also displays, on each UI line, objects generated by applications or widget programs implemented in the control unit 120, selects the background image according to the previous operation and configures the background screen having the background image and the UI lines. The configured background screen data is provided to the panel unit 110, and the panel unit 110 uses the data to display the background screen.

The touch detection unit 113 is placed inside of the panel unit 110 and detects the location of a point a user touches in the panel and a direction of a dragging operation performed by the user. The touch detection unit 113 may be a pressure sensor, a touch sensor, a photo diode, and/or other kinds of sensors.

The rotation detection unit 150 detects a rotational state of the user terminal device 100. Specifically, the rotation detection unit 150 may be a gyroscope sensor, an accelerometer sensor, a geomagnetic sensor, etc. The rotation detection unit 150 uses an output value detected from such sensors to calculate a change in a pitch angle, a roll angle, a yaw angle, and an azimuth angle of the user terminal device 100. The rotation detection unit 150 sends the calculation results to the control unit 120.

The control unit 120 controls the GUI processing unit 112 to reconfigure the background screen in various ways in consideration of a user manipulation detected by the touch detection unit 113 and a rotated state of the user terminal device 100 detected by the rotation detection unit 150.

The control unit 120 may execute various programs stored in the storage unit 130. The storage unit 130 stores Operating Systems (O/Ss), applications, and widget programs, as well as data and information that are necessary to execute those programs and/or data acquired when executing the programs. The control unit 120 controls the GUI processing unit 112 to generate various objects and background images by executing programs stored in the storage unit 130.

Meanwhile, the control unit 120 may download contents or programs by accessing various servers via the communication unit 140. Accordingly, if an updated content or program is located in a server, the control unit 120 controls the GUI processing unit 112 to reload the object in accordance with the updated state and display the updated objects in respective UI lines.

Under the control of the control unit 120, the communication unit 140 may access a communication network and download various programs and data from a server connected to the corresponding communication network. The communication network may any of Wireless Fidelity (Wi-Fi), Third Generation (3G), and/or other communication networks.

Figure 12:
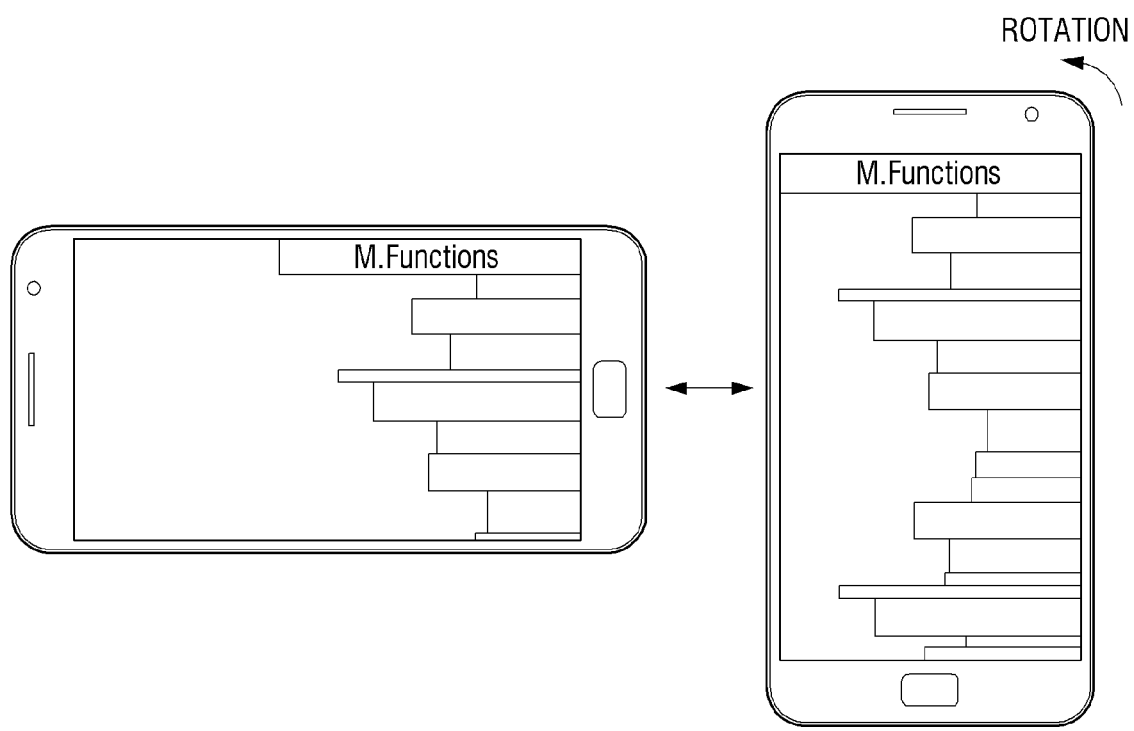
FIG. 12 is a diagram illustrating an example where a location to display a background image and UI lines is changed according to a rotation of a user terminal device according to an embodiment of the present invention.

FIG. 12 is a diagram illustrating an example where a location to display a background image and UI lines is changed according to a rotation of a user terminal device according to an embodiment of the present invention.

Referring to FIG. 12, if the user terminal device 100 is rotated by 90° counterclockwise from the orientation shown in the rightmost image to the orientation shown in the leftmost image, the rotation detection unit 150 detects the rotation and provides the detection result to the control unit 120. The control unit 120 controls the GUI processing unit 112 to rotate the background screen having a background image, a fixed menu region and UI lines by 90° clockwise, such that the orientation of these images appears the same from the perspective of the user.

If the width and length of a display panel are different, the GUI processing unit 112 may reconfigure width and length of the UI lines according to the respective lengths. As illustrated in FIG. 12, if the display panel is rotated by 90° counterclockwise from a normal state where the length is longer than the width as shown in the rightmost image, the width becomes longer the length as shown in the leftmost image. Accordingly, the UI lines may be appear longer in the leftmost image, thereby displaying more objects.

Figure 13:
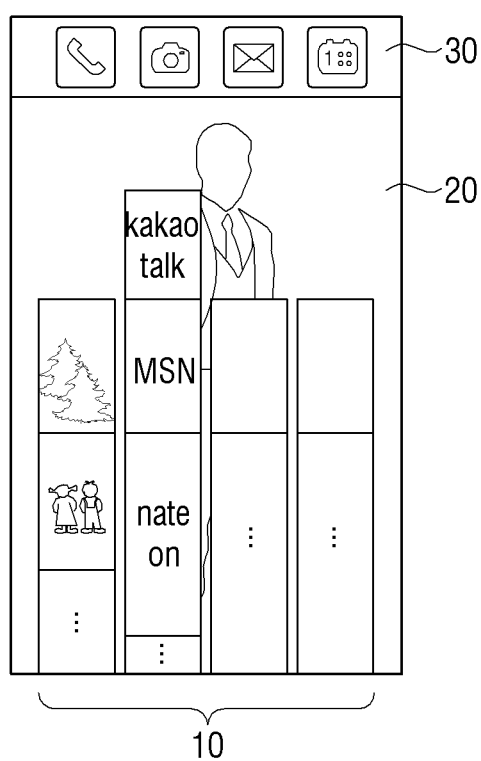
FIGS. 13 to 15 are diagrams illustrating various examples of background screens according to an embodiment of the present invention.
Figure 14:
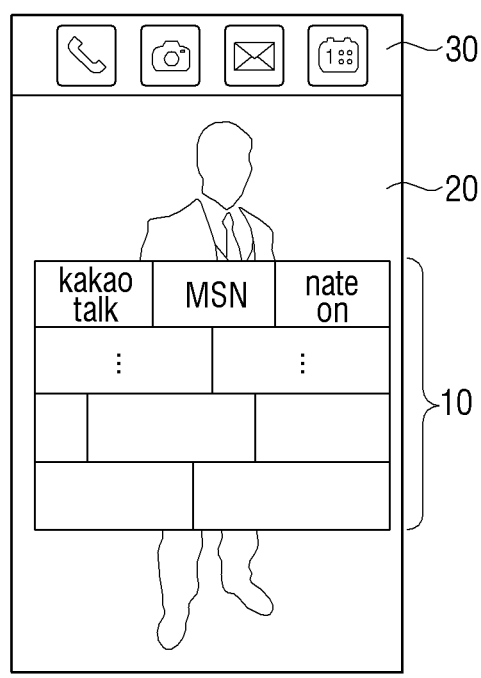
Figure 15:
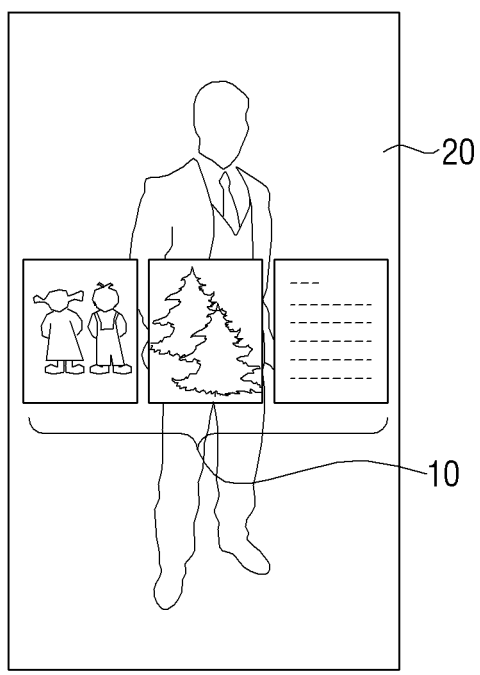

FIGS. 13 to 15 are diagrams illustrating various examples of background screens according to an embodiment of the present invention.

Referring to FIG. 13, UI lines 10 are displayed in the vertical direction extending upwards from the lower part of a background image 20, and a fixed menu region 30 is displayed in the upper part of the background image 20. Referring to FIG. 14, UI lines 10 are overlapped with the center part of the background image 20 and a fixed menu region 30 is displayed in the upper part of the background image 20. In this case, the UI lines 10 may be at least partially transparent so that they may not obscure portions of the background image 20 overlapped by the UI lines 10. Referring to FIG. 15, UI lines 10 are displayed in a form of tiles, objects displayed on each of the tiles change as time passes, and one of the objects is enlarged and displayed as the background image 20. As described above, the background screen may be configured in various ways. The objects and the background images displayed on the background screen 20 are dynamically configured in real time by reflecting an updated state. In addition, a user may easily open a picture, check a message and play a video clip through the UI lines 10.

Figure 16:
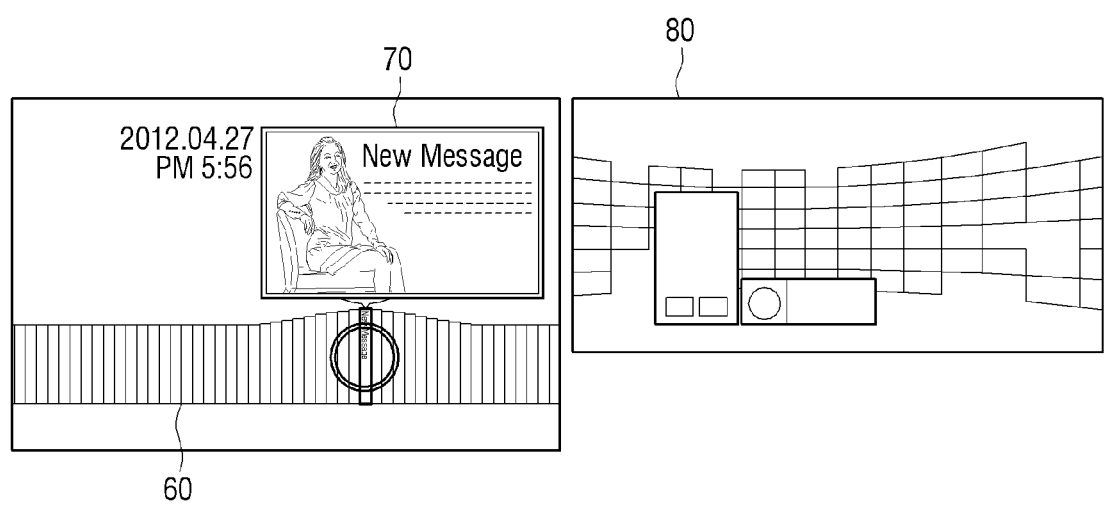
FIG. 16 is a diagram illustrating an example of a configuration of an idle screen according to an embodiment of the present invention.

FIG. 16 is a diagram illustrating an example of a configuration of an idle screen according to an embodiment of the present invention.

Referring to FIG. 16, if no user input is detected for a predetermined period of time, a control unit 120 enters a lock mode. In the lock mode, the control unit 120 controls the display unit 110 to display an idle screen, such as that shown in the leftmost image of FIG. 16. On the idle screen, a content list 10 is displayed. On the content list, a plurality of content version information is displayed according to an order of updated time. In other words, various kinds of information are displayed in sequence starting with the most recently updated information.

If the user performs a dragging operation on the content list 10, a point touched by the user becomes highlighted, and a preview image 70 for content version information corresponding to the currently-touched point is displayed on one side of the idle screen. In addition information about an updated time and date may be displayed together, along a side of the preview image 70.

A user may check the updated state on the idle screen and select one of the content version information on the content list 10. If the content version information is selected, the control unit 120 cancels the lock mode, turning into an unlock mode, as shown in the rightmost image of FIG. 16. In addition, the control unit 120 controls the display unit 110 to immediately display an application execution screen 80 corresponding to the updated version information. The control unit 120 may determine whether user manipulation to drag the content list and selecting content version information is input according to a time and pace of the user's touch. For example, if the touch time is short and the pace is fast, the control unit 120 recognizes the touch as a dragging operation and scrolls the content list to display the preview image 70 of the content version information moved to a specific location. However, if the touch time is long, the control unit 120 recognizes the content version information to be selected and controls the display unit 110 to switch the idle screen over the application execution screen 80.

Figure 17:
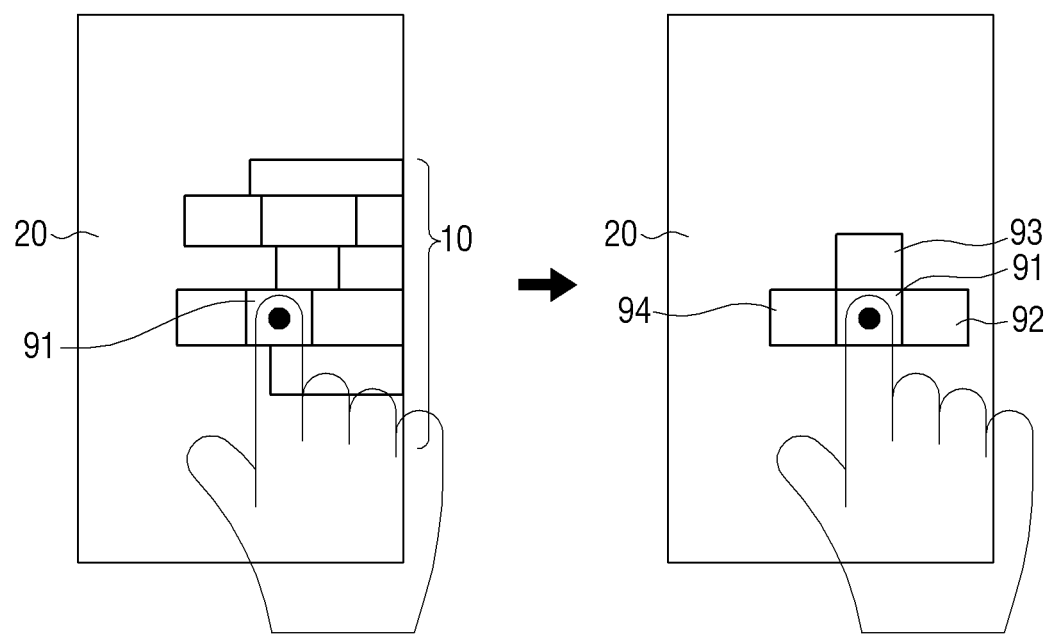
FIG. 17 is a diagram illustrating a method for displaying relevant objects according to an embodiment of the present invention.

FIG. 17 is a diagram illustrating a method for displaying relevant objects according to an embodiment of the present invention.

Referring to FIG. 17, if a user selects an object region 91 from within a plurality of UI lines 10, a control unit 120 removes UI lines, except for the selected object region 91, and additionally controls the display unit to display objects 92, 93, and 94 related to the selected object 91 in an area directly surrounding the selected object 91. The searched other objects 92, 93, and 94 may be displayed individually in the surrounding of the object 91 sequentially. The searched objects may be objects that are used in a same time zone corresponding to a usage record of the selected object 91 or objects belonging to a same category as the selected object 91.

FIG. 17 illustrates a case where an object 91 is selected on the UI line 10 and objects relating to the selected object 91 are displayed. According to another embodiment of the present invention, when a user selects the object 91, the UI lines 10 are removed, and objects relating to the selected object 91 are displayed on various application execution screens and other screens.

Figure 18:
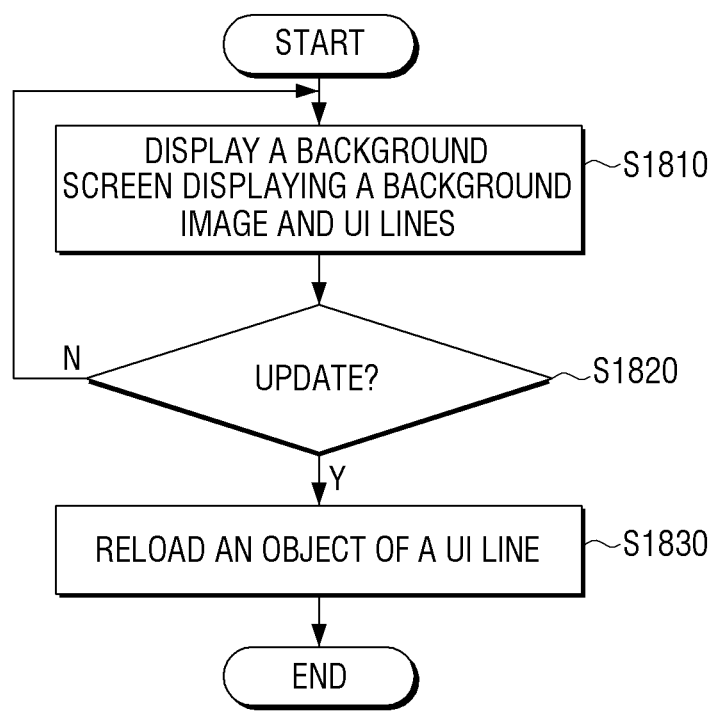
FIGS. 18 and 19 are flowcharts illustrating a method for displaying a background screen of a user terminal device according to an embodiment of the present invention.

FIG. 18 is a flowchart illustrating a method for displaying a background screen according to an embodiment of the present invention. Referring to FIG. 18, when a user terminal device is turned on, a background screen having a background image and UI lines is displayed, in step S1810.

If objects of the UI lines are updated at step S1820, the user terminal device reconfigures the UI lines by reloading the updated objects at step S1830. The reloaded objects are displayed at an end of a corresponding UI line. The length and the width of the UI lines may also be adjusted individually according to a user manipulation. Various other operations related to configuration of the background screen and a method for changing the background screen described hereinabove may also be applied to the method of FIG. 18 in accordance with embodiments of the present invention.

Figure 19:
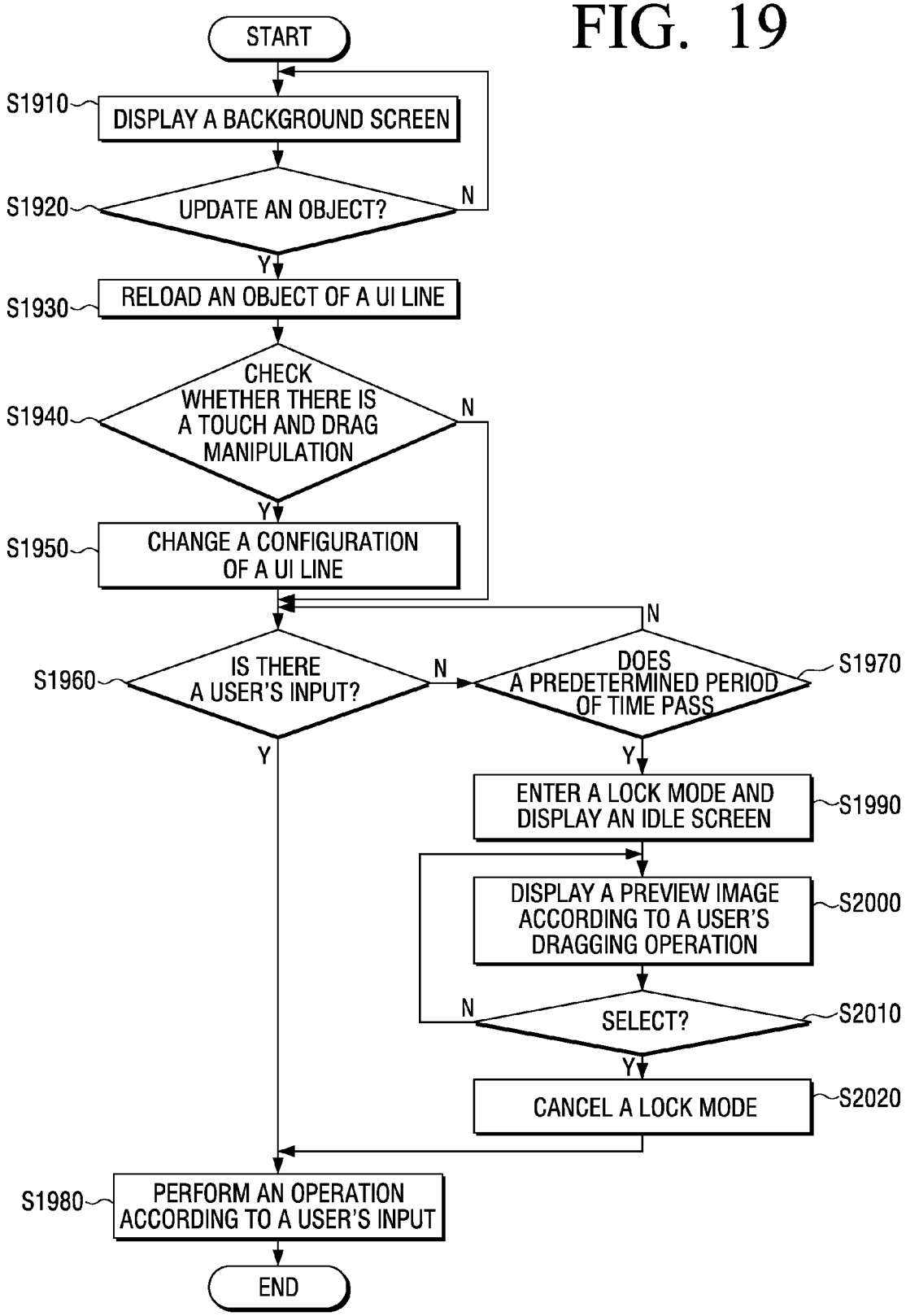

FIG. 19 is a flowchart illustrating a method for displaying a background screen according to another embodiment of the present invention.

Referring to FIG. 19, in step 1910 a background screen is displayed. If an object is updated in step 1920, the object displayed on a UI line is reloaded at step S1930.

If a user's touch-and-drag manipulation on the background screen is detected at step S1940, the configuration of the UI line changes according to the user manipulation at step S1950.

If a user's input selecting a specific object from the UI lines or a specific menu of the fixed menu region on the background screen is detected at step S1960, an operation corresponding to the user manipulation is performed at step S1980. For example, if an application icon is selected, an application execution screen corresponding to the selected icon is displayed. If a phone menu is selected, a phone screen where a phone number may be input is displayed.

Meanwhile, upon determining that a predetermined period of time has passed without any user input at step S1970, a lock mode begins and an idle screen is displayed at step S1990. On the idle screen, a content list including various updated versions of information is displayed. A user may check various updated versions of information displayed on the content list by performing a dragging operation. In step S2000, a preview image corresponding to content version information, which corresponds to a point in which the dragging operation is performed, is displayed.

The user may select one of the content version information included in the content list. If content version information is selected at step S2010, the lock mode is released at step S2020 and an operation corresponding to the selected content version information is performed at step S1980. For example, the application execution screen corresponding to the updated version may be immediately displayed.

Although not illustrated in FIG. 19, if a user touches a UI line, an additional process in which an indicator appears at an end of a corresponding UI line to indicate whether the touched UI line can be dragged may be included. Further, if the fixed menu region is displayed on the background screen, a process for executing a function included in the fixed menu region may also be included in the method of FIG. 19. If a predetermined manipulation of a user is performed in the fixed menu region, a process to switch the background screen over a full-menu screen may also be included. Herein, the predetermined manipulation of a user may be touching the fixed menu region and dragging the touched region to the left or to the right.

According to another embodiment of the present invention, referring to FIG. 17, if one object of one of a plurality of UI lines is selected, a process to remove the plurality of UI lines and display at least one object related to the selected object in the surrounding of the selected object may be included. Accordingly, a preview image can be provided even in a lock mode.

As described above, objects according to embodiments of the present invention may include objects such as a picture, a video clip, an image, a text, an icon, a widget screen, etc., and a background screen having UI lines and a background may be reconfigured anytime by reflecting a real-time updates. Accordingly, a still background screen, as well as a dynamic background screen may be provided in order to increase the convenience and ease of use of user terminal devices.

Programs to employ the methods according to embodiments of the present invention may be stored in various recording media and used.

Specifically, codes to employ the methods according to embodiments of the present invention may be stored in various types of terminal-readable recording media, such as Random Access Memory (RAM), flash memory, Read Only Memory (ROM), Erasable Programmable ROM (EPROM), Electronically Erasable and Programmable ROM (EEPROM), a register, hard disk, a removable disk, a memory card, Universal Serial Bus (USB) memory, Compact Disc (CD)-ROM, etc.

While the invention has been shown and described with reference to certain embodiments thereof, it will be understood by those skilled in the art that various changes in form and details may be made therein without departing from the scope of the invention as defined by the appended claims and their equivalents.

What is claimed is:

1. A user terminal device, comprising:
a display unit for displaying a plurality of UI lines, wherein each of the plurality of UI lines includes objects, wherein each object corresponds to a program or a content classified by different categories, and a background image corresponding to one of the objects overlapped by the plurality of UI lines; and
a control unit that controls the display unit to change the objects displayed on the plurality of UI lines in accordance with an update state of the objects, reconfigure the changed objects, and display the reconfigured objects, and when sensing a user manipulation for selecting one of the objects, executes the program or reproduces the content corresponding to the selected object,
wherein a length of each of the plurality of UI lines is changeable independently of the other of the plurality of UI lines.

2. The device as claimed in claim 1, wherein the plurality of UI lines is displayed along one side of the background image, each of the plurality of UI lines is divided into a plurality of object regions in which objects of a corresponding category are displayed, and a most recently updated object from among the objects displayed on each corresponding UI line is moved to and displayed in an object region at an end of each corresponding UI line.

3. The device as claimed in claim 2, wherein the control unit controls at least one of a displayed length of the plurality of UI lines and a displayed size of the object regions according to an amount of updates in each of the objects.

4. The device as claimed in claim 1, wherein, upon detecting a user input corresponding to a touch and drag with respect to one of the plurality of UI lines, the control unit increases or reduces a length or width of the touched UI line along a direction in which the touched UI line is dragged.

5. The device as claimed in claim 4, wherein, upon detecting a user input corresponding to a touch upon one of the plurality of UI lines, the control unit controls the display unit to display, at an end of the touched UI line, an indication of whether the touched UI line can be dragged.

6. The device as claimed in claim 1, wherein, if no user input is detected for more than a predetermined period of time, the control unit enters a lock mode and controls the display unit to display an idle screen including a content list in which a plurality of content version information items is arranged in update order,
wherein, upon detecting a user input corresponding to a drag on the content list, the display unit displays a preview image corresponding to each of the plurality of content version information items along one side of the idle screen according to the drag, and
wherein, upon receiving a user selection of one of the plurality of content version information items from the content list, the control unit cancels the lock mode and controls the display unit to display an execution screen corresponding to the selected content version information item.

7. The device as claimed in claim 1, wherein the background screen includes a fixed menu region displaying at least one fixed menu, and, upon receiving a selection of a fixed menu item from the fixed menu region, the control unit executes a function corresponding to the selected fixed menu item and,
wherein upon detecting a predetermined user input with respect to the fixed menu region, the control unit converts the background screen into a full menu screen.

8. The device as claimed in claim 1, wherein the control unit controls the display unit to sequentially output images corresponding to the objects displayed on each of the plurality of UI lines as the background image.

9. The device as claimed in claim 1, wherein upon detecting a user input corresponding to a touch with respect to an object from one of the plurality of UI lines, the control unit ends the display of the plurality of UI lines and controls the display unit to display, near the selected object, at least one other object related to the selected object.

10. The device as claimed in claim 1, wherein the objects include at least one of a photo, a video, an image, a text, an icon, and a widget screen.

11. A method for displaying a background screen of a user terminal device, comprising:
displaying a background screen having a plurality of UI lines, wherein each of the plurality of UI lines includes objects, wherein each object corresponds to a program or a content classified by different categories, and a background image corresponding to one of the objects overlapped by the plurality of UI lines;
changing the objects displayed on the plurality of UI lines in accordance with an update state of the objects, reconfiguring the changed objects, and displaying the reconfigured objects; and
when sensing a user manipulation for selecting one of the objects, executing the program or reproducing the content corresponding to the selected object,
wherein a length of each of the plurality of UI lines is changeable independently of the other of the plurality of UI lines.

12. The method as claimed in claim 11, wherein the plurality of UI lines is displayed along one side of the background image, each of the plurality of UI lines is divided into a plurality of object regions in which category objects corresponding to the UI lines are displayed, and a most recently updated object from among objects displayed on each corresponding UI line is moved to the object region at an end of each corresponding UI line.

13. The method claimed in claim 12, wherein at least one of a displayed length of each of the plurality of UI lines or a displayed size each of the object regions is adjusted differently according to an amount of updates in each of the categories and displayed.

14. The method claimed in claim 11, further comprising:
performing, upon detecting a user input corresponding to a touch and drag with respect to one of the plurality of UI lines, an increase or reduction of a length or a width of the touched UI line along a direction in which the touched UI line is dragged.

15. The method claimed in claim 11, further comprising:
displaying, upon detecting a user input corresponding to a touch upon one of the plurality of the UI lines, at an end of the touched UI line, an indication of whether the touched UI line can be dragged.

16. The method claimed in claim 11, further comprising:
entering, if no user input is detected for more than a predetermined period of time, a lock mode and displaying an idle screen including a content list in which a plurality of content version information items is arranged;
displaying, upon receiving a user input corresponding to a drag with respect to the content list, a preview image corresponding to each of the plurality content version information items along one side of the idle screen according to the drag; and
cancelling, upon receiving a user selection of one of the plurality of content version information items from among the content list, the lock mode and displaying an execution screen corresponding to the selected content version information item.

17. The method as claimed in claim 11, further comprising:
executing, upon receiving a selection of a fixed menu item included in a fixed menu region in the background screen, a function corresponding to the selected fixed menu item; and
switching, upon detecting a predetermined user input corresponding to the fixed menu region, the background screen over a full-menu screen.

18. The method as claimed in claim 11, further comprising:
removing, upon detecting a user input corresponding to touch upon an object of one of the plurality of UI lines, the plurality of UI lines and displaying, near the selected object, at least one other object related to the selected object.

19. The method as claimed in claim 11, wherein the objects include as at least one of a picture, a video clip, an image, a text, an icon and a widget screen.

20. A non-transitory recording media storing a program to employ a method for displaying a background screen, the method comprising:
displaying a background screen having a plurality of UI lines, wherein each of the plurality of UI lines includes objects, wherein each object corresponds to a program or a content classified by different categories and a background image corresponding to one of the objects overlapped by the plurality of UI lines;
changing the objects displayed on the plurality of UI lines in accordance with an update state of the objects, reconfiguring the changed objects, and displaying the reconfigured objects; and
when sensing a user manipulation for selecting one of the objects, executing the program or reproducing the content corresponding to the selected object,
wherein each of the plurality of UI lines is divided into a plurality of object regions in which category objects corresponding to each of the UI lines are displayed, and a length of each of the plurality of UI lines is changeable independently of the other of the plurality of UI lines.

* * * * *